Sept. 15, 1931. R. BARKER 1,823,385
SUPPORTING STRUCTURE FOR FRUIT PICKERS
Filed July 22, 1929
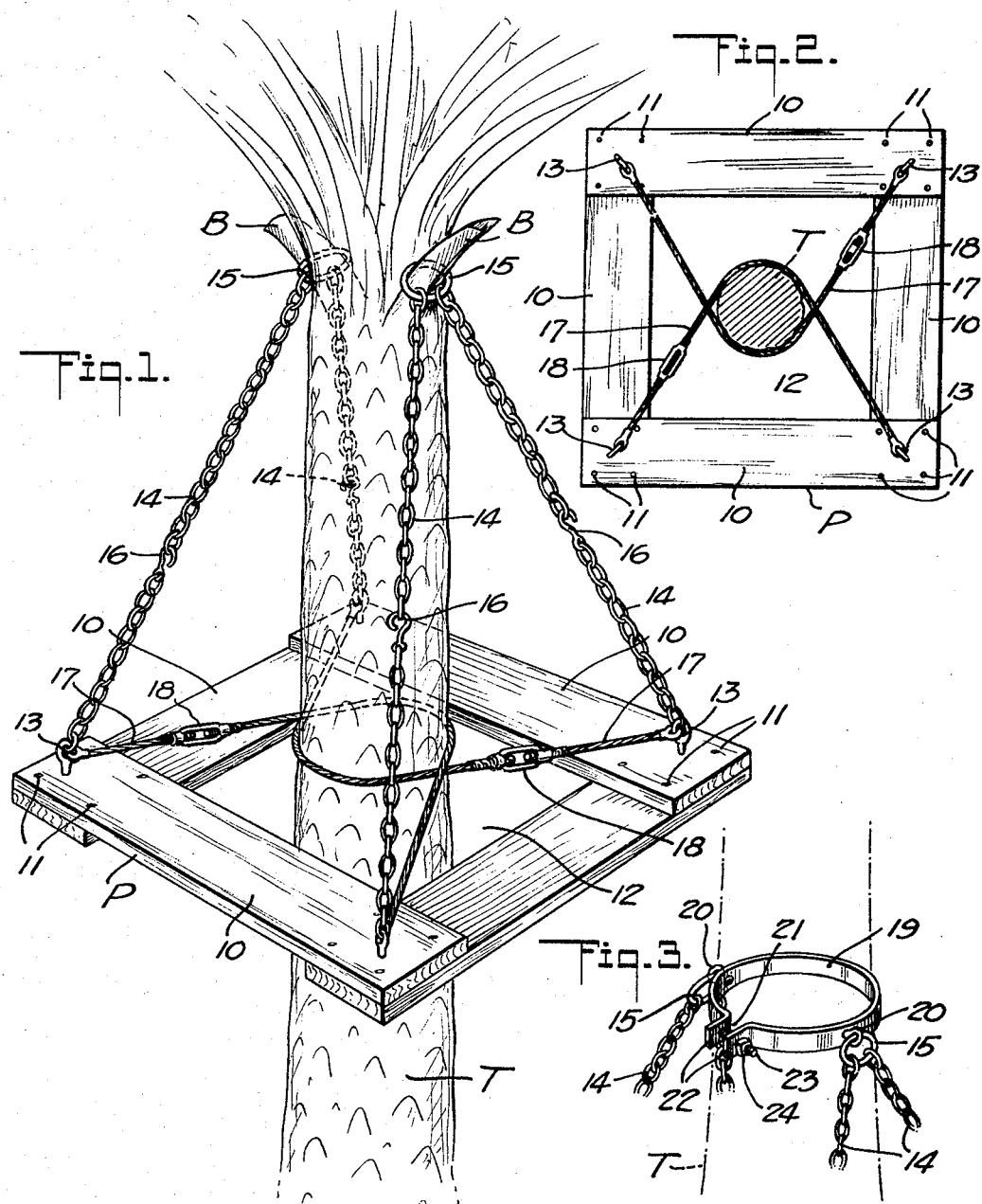
INVENTOR
ROBERT BARKER
BY
ATTORNEYS Patented Sept. 15, 1931

1,823,385

UNITED STATES PATENT OFFICE

ROBERT BARKER, OF INDIO, CALIFORNIA

SUPPORTING STRUCTURE FOR FRUIT PICKERS

Application filed July 22, 1929. Serial No. 380,023.

My invention relates to and has for a purpose the provision of a supporting structure particularly adapted, although not necessarily, for application to a fruit tree, such as a date palm for example, in a manner to be suspended from the tree and provide a stable platform on which an operator can stand and move about in convenient reach of the fruit of the tree so as to permit picking of the fruit with the utmost ease and dispatch.

It is another purpose of my invention to provide a supporting structure of the above described character embodying the desirable qualities of simplicity of construction and inexpensiveness of manufacture, so that all trees in an orchard can be equipped with the supporting structures which can remain applied to the trees as a permanent installation, and all without any detrimental effects upon the trees.

It is a further purpose of my invention to provide a fruit picker's supporting structure which is capable of being suspended either from branches of the tree or directly from the trunk of the tree as desired.

I will describe only one form of supporting structure for fruit pickers embodying my invention and will then point out the novel features thereof in claims.

In the accompanying drawings,

Figure 1 is a view showing in perspective, one form of supporting structure for fruit pickers embodying my invention, applied to a date palm tree.

Figure 2 is a plan view of the supporting structure shown in Figure 1, with suspension members embodied in the structure omitted for the sake of clearness, and Figure 3 is a fragmentary perspective view illustrating a modified form of attaching means embodied in the supporting structure.

Referring specifically to the drawings in which similar reference characters designate similar parts in each of the several views, my invention in its present embodiment comprises a platform designated generally at P and in the present instance constructed of a plurality of floor sections 10 in the form of wooden boards, of which four are illustrated. The floor sections 10 are secured together by suitable fastening members 11 and co-operate to define an opening 12 through which the trunk of the tree is freely received. At the four corners of the platform P, eye bolts 13 are secured; and to the eye bolts the lower ends of suspension members 14, in the present instance illustrated as chains, are connected. The upper ends of the suspension members 14 are connected in pairs to metallic rings 15 which broadly constitute attaching means for the suspension members.

The rings 15 are of such diameter as to freely receive branches B of the tree so as to be supported therefrom and co-act with the suspension members in supporting the platform from the tree. In order to permit leveling of the platform to a horizontal position when the platform is applied to the tree, each of the suspension members 14 is in two sections connected by hooks 16 on one section adapted to be engaged with any of the links of the other section to increase or decrease the overall lengths of the suspension members in order to correct any tilting of the platform and insure that the latter will occupy a horizontal position.

To the eye bolts 13 are also connected the ends of a pair of holding members 17 in the form of flexible cables adapted to embrace the trunk of the tree from opposite sides thereof. In each of the holding members 17 a turnbuckle 18 is provided for placing the holding members under tension so that they will co-act to hold the platform in a fixed position against lateral displacement with the tree trunk disposed centrally of the opening 12.

In applying the supporting structure above described to a date palm tree for example, the floor sections 10 are first secured together on the ground around the trunk of the tree by the fastening members 11, after which the suspension members 14 and holding members 17 are secured to the platform adjacent its four corners by means of the eye bolts 13. Two of the uppermost and diametrically opposite branches or fronds of the tree are cut off a short distance from the trunk, as illustrated in Figure 1, after which the platform is raised by using a ladder or other suitable means, to a height sufficient to enable the rings 15 of the suspension members 14 to be slipped over the stumps of the two previously cut branches. The platform will thus be supported from the tree; and should the platform not be level the hooks 16 are adjusted to vary the lengths of the suspension members as required to bring the platform to a horizontal position.

With the holding members 17 loosely wrapped around the tree trunk from opposite sides thereof as illustrated, their turnbuckles 18 are adjusted until the holding members are drawn taut and thus placed under tension to tightly embrace the tree, thus positively holding the platform rigid against any lateral swinging movement. The platform will thereby be suspended from the tree in a fixed elevated position wherein an operator standing on the platform can conveniently reach and pick the fruit from the tree.

In the event that it is not desired to cut off branches of the tree in order to permit application of the rings 15, a metallic band 19 (Figure 3) can be employed in lieu of the rings, which latter in this instance will be connected to eye bolts 20 projecting from the band 19 at diametrically opposed points. The band is split as indicated at 21 to permit of its being expanded sufficiently to receive the tree trunk, and is provided with ears 22 receiving a headed bolt 23 on which is threaded a nut 24 for co-action with the bolt in contracting the band into clamping engagement with the tree trunk to support the platform at the desired height.

The supporting structure can be permitted to remain on the tree permanently as the structure is inexpensive to manufacture and one can be provided for each tree in a grove at comparatively small cost, which is greatly offset by the decided advantages of the structure in providing a stable platform on which the picker can stand and move about within convenient reach of the fruit. It is only necessary as a tree grows, that succeeding higher branches be cut off as previously described, when fruit is to be picked from the tree, and the rings 15 slipped thereover in order to further elevate the platform to the height necessary for the picker to conveniently reach the fruit; or in the event that the band 19 be used, that the band be loosened from the three trunk and then clamped again to the latter at a higher point.

Although I have herein shown and described only one form of supporting structure for fruit pickers embodying my invention, it is to be understood that various changes and modifications may be made therein without departing from the spirit of the invention and the spirit and scope of the appended claims.

I claim:

1. A supporting structure of the character described comprising a platform having an opening adapted to receive the trunk of a tree, and suspension members connected at spaced intervals to the platform and having rings adapted to receive branches of the tree to support the platform from the tree.

2. A supporting structure of the character described comprising a platform having an opening adapted to receive the trunk of a tree, suspension members connected at spaced intervals to the platform and having attaching means adapted to be secured to the tree to support the platform from the tree, and means for holding the platform rigid so that it provides a stable support for an operator, comprising cables connected to the platform at spaced points and adapted to embrace the trunk of the tree from opposed sides.

3. A supporting structure of the character described comprising a platform having an opening adapted to receive the trunk of a tree, suspension members connected at spaced intervals to the platform and having attaching means adapted to be secured to the tree to support the platform from the tree, and means for holding the platform rigid so that it provides a stable support for an operator, comprising holding members connected to the platform and adapted to engage the trunk of the tree to exert forces in opposed directions.

4. A supporting structure of the character described comprising a platform having an opening adapted to receive the trunk of a tree, means for suspending the platform from the tree, and means for holding the platform against lateral movement so that it provides a stable support for an operator, comprising flexible cables connected to the platform and adapted to embrace the trunk of the tree from opposed sides.

5. A supporting structure of the character described comprising a platform having an opening adapted to receive the trunk of a tree, means for suspending the platform from the tree, holding members connected to to the platform and adapted to engage opposed sides of the tree trunk, and means for placing the holding members under tension for co-action in holding the platform against lateral movement.

6. A supporting structure of the character described comprising a plurality of floor sections secured together and co-operating to define a continuous platform having a tree trunk receiving opening, suspension members connected to the platform, means for connecting said members to the tree to support the platform from the latter in surrounding relation thereto, and flexible cables connected to the platform and adapted to embrace the tree trunk from opposite sides to hold the platform in a fixed position against lateral displacement.

Signed at Indio, California this 5th day of July, 1929.

ROBERT BARKER.